(12) United States Patent
Xu et al.

(10) Patent No.: US 6,992,034 B2
(45) Date of Patent: Jan. 31, 2006

(54) CATALYST COMPONENT FOR OLEFIN POLYMERIZATION

(75) Inventors: Guangxue Xu, Port Lavaca, TX (US); Honglan Lu, Port Lavaca, TX (US); Chih-Jian Chen, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 183 days.

(21) Appl. No.: 10/617,238

(22) Filed: Jul. 10, 2003

(65) Prior Publication Data

US 2005/0009690 A1    Jan. 13, 2005

(51) Int. Cl.
C08F 4/609 (2006.01)
C08F 4/602 (2006.01)
C08F 4/603 (2006.01)
C08F 4/606 (2006.01)

(52) U.S. Cl. .............. 502/123; 502/113; 502/115; 502/116; 502/119; 502/128; 526/113; 526/114; 526/124.4; 526/124.7; 526/124.8; 526/124.9

(58) Field of Classification Search ............... 502/113, 502/115, 116, 119, 123, 128; 526/113, 114, 526/124.4, 124.7, 124.8, 124.9

See application file for complete search history.

(56) References Cited

U.S. PATENT DOCUMENTS

| 5,439,995 | A  | 8/1995  | Bailly et al. ............. 526/125 |
| 6,420,501 | B1 | 7/2002  | Uwai et al. ............. 526/165 |
| 6,432,860 | B1 | 8/2002  | Shamshoum et al. ....... 502/103 |
| 6,433,111 | B1 | 8/2002  | Kristen et al. ........... 526/141 |
| 6,444,606 | B1 | 9/2002  | Bingel et al. ............ 502/152 |
| 6,469,113 | B1 | 10/2002 | Lee et al. ............... 526/126 |
| 6,521,728 | B1 | 2/2003  | Diefenbach ............. 526/165 |
| 6,524,988 | B2 | 2/2003  | Speca .................. 502/152 |
| 2002/0161141 | A1 | 10/2002 | Mawson et al. |

*Primary Examiner*—Caixia Lu
(74) *Attorney, Agent, or Firm*—Howrey LLP

(57) ABSTRACT

A solid catalyst component useful for the (co)-polymerization of olefins is disclosed. The catalyst component is prepared by reacting an activated magnesium halide composite support with a halogenized transition metal compound and a chelating diamide compound in the presence of organo-magnesium as a promoting agent and halogenized silicon or boron compounds as an activator. The catalyst component can be used with an organo-aluminum compound to provide a solid catalyst system that is compatible with slurry and gas phase polymerization processes. Linear low density polyethylene (LLDPE) produced using the catalyst component of the present invention displays a low molecular weight distribution, improved co-monomer incorporation, low content of the low molecular weight component, and excellent morphological properties such as spherical shape and high bulk density.

12 Claims, No Drawings

US 6,992,034 B2

CATALYST COMPONENT FOR OLEFIN POLYMERIZATION

FIELD OF THE INVENTION

The invention relates to the field of polymer chemistry and, more specifically, to a catalyst for polymerizing alpha-olefins and a method for producing such a catalyst. In particular, a catalyst containing a diamine compound is disclosed. The catalyst of the present invention is useful for producing linear low density copolymers of ethylene (LLDPE).

BACKGROUND OF THE INVENTION

Polyolefin polymers are well known and are useful in many applications. In particular, linear low-density polyethylene (LLDPE) polymers possess properties that distinguish them from other polyethylene polymers, such as branched ethylene homopolyethylene polymers (low density polyethylene, LDPE). The market for LLDPE grown rapidly, particularly for applications such as blown and cast films, injection molding, rotational molding, blow molding, pipe, tubing, and wire and cable applications. A principal area for LLDPE copolymers is in film forming applications because copolymers typically exhibit high dart impact, high Elmendorf tear, high tensile strength and high elongation, in both the machine direction (MD) and the transverse direction (TD), compared with counterpart LDPE resins. Some of these properties are described in U.S. Pat. No. 4,076,698.

Ziegler-Natta type catalyst systems for the producing polyethylene and linear low density polyethylene (LLDPE) are well known in the art. An example of such a catalyst system is described in U.S. Pat. No. 3,113,115.

Recently, advances in polymerization and catalysis have resulted in the ability to produce many new polymers having improved physical and chemical properties and that are useful in a wide variety of superior products and applications. Areas of improvement in olefin polymerization catalysts are exemplified by improved co-monomer incorporation, narrower molecular weight distribution, uniform particle size distribution and copolymer composition distribution, and efficient control of the average molecular weight and morphology of the catalyst particles for the heterogeneous co-polymerization of olefins, especially ethylene.

With the development of new catalysts, the choice of available polymerization techniques (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing metallocene, non-metallocene catalyst systems, and other advanced "single-site" catalyst systems.

Using metallocene and metallocene type catalyst precursors for alpha-olefin polymerization affords better control of molecular weight and provides narrower molecular weight distributions for the resulting polymer, relative to classical Ziegler-Natta catalyst components composed of a titanium trichloride or titanium tetrachloride and a trialkyl-aluminum as co-catalyst. Metallocene and metallocene type catalysts and their polymerization processes are well known and studied in the art. These catalyst precursors and metallocene-based polymerization processes are, however, limited in many respects of commercial applications. Metallocene type catalysts typically exhibit relatively moderate activity for alpha-olefin polymerization, and are limited in terms of availability and versatility for current polymerization process. More importantly, metallocene catalyst precursors are relatively difficult to synthesize, a fact that limits the possibility of developing new varieties of metallocene type alpha-olefin polymerization catalysts.

Currently, there is growing interest in developing non-metallocene catalyst precursors, catalyst systems, and related catalytic processes for alpha-olefin polymerization to produce polyolefin with well-defined bulk physicochemical properties and molecular physicochemical characteristics. Methods are being sought to overcome the above-mentioned limitations associated with metallocene catalyst systems. One example of a non-metallocene catalyst precursor is activated with methylaluminoxane (MAO) as co-catalyst, and is preferably employed for catalysis in an aromatic hydrocarbon solution. Unfortunately, this catalyst system is not suited for heterogeneous polymerization in aliphatic hydrocarbons or for gas phase polymerization.

Catalyst systems in industrial slurry or gas phase processes typically comprise a catalyst compound immobilized on a carrier or support material such as silica or alumina. Supported or heterogeneous catalysts increases process efficiencies by allowing the forming polymeric particles to achieve shapes and densities that maximize reactor operability and ease of handling. Examples of supported metallocene catalyst system for industrial slurry or gas phase polymerization are described in U.S. Pat. Nos. 6,524,988; 6,521,728; 6,469,113; 6,444,606; 6,432,860; 6,420,501; 6,433,111; and 5,439,995. An example of a supported non-metallocene catalyst is described in U.S. Patent Application No. 20020161141 A1. This application describes a polymerization process whereby an unsupported non-metallocene catalyst solution and a slurry of silica-supported methylalumoxane (MAO) is introduced into the polymerization reactor.

However, bulky ligand metallocene and metallocene-type catalysts, non-metallocene-type catalysts, and even 'single-site' advanced catalysts typically exhibit lower activity when supported compared to the activity of a non-supported or homogeneous form. This "support effect" makes commercialization of these promising catalyst systems more difficult in existing polymerization process. Consequently, there is a need in the art for method of modifying a Ziegler-Natta catalyst with non-metallocene ligands to form a solid catalyst component with high activity.

SUMMARY OF THE INVENTION

The present invention fills this need in the art by providing a method of modifying a Ziegler-Natta catalyst with non-metallocene ligands via an in situ reaction to form a solid catalyst component with high activity.

The catalyst component of the present invention is prepared by treating a magnesium halide composite support with a halogenized transition metal compound (e.g., $MCl_4$, M includes Ti, Zr, Hf, V, Cr) and a chelating diamine compound or its silylated derivative in the presence of organomagnesium as a promoting agent and halogenized silicon or boron compounds as activator thereof. The composite magnesium halide support is typically prepared by reacting metallic magnesium with (i) an alkyl halide or aromatic halide; (ii) a transition metal compound having the structural formula $M(OR)_a X_{4-a}$, wherein M is selected from the group consisting of Ti, Zr, Hf, V, and Cr; R is a $C_{1-20}$ hydrocarbon, X is halogen, and a is an integer from 1 to 4; (iii) at least one electron donating compound containing at least one ether group; and (iv) at least one organo-silicon compound having at least one silicon-oxygen bond.

In the catalyst component of the present invention, a chelating diamine compound or its silylated derivative are selected from compounds having the general structural Formula I:

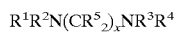

$R^1R^2N(CR^5{}_2)_xNR^3R^4$ wherein $R^1$, $R^2$, $R^3$ and $R^4$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl; provided that at least both $R^1$ and $R^3$ are hydrogen, trimethylsilyl, or triethylsilyl group; $R^5$ is hydrogen or $C_{1-20}$ hydrocarbon, and x is from 1 to 7; diamino-pyridene ligands of the Formula II:

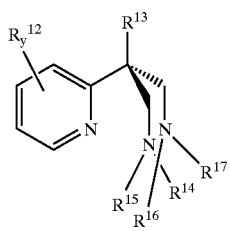

wherein $R^{12}$ is independently hydrogen or $C_{1-20}$ alkyl, or two $R^{12}$ groups may together form a ring, y is 1 or 2; $R^{13}$ is hydrogen or $C_{1-40}$ alkyl; $R^{14}$, $R^{15}$, $R^{16}$ and $R^{17}$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl; provided that at least both $R^{14}$ and $R^{16}$ are hydrogen atom or trimethylsilyl or triethylsilyl group; and diketiminato ligands of Formula III:

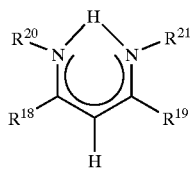

wherein $R^{18}$ and $R^{19}$ are independently hydrogen, $C_{1-20}$ hydrocarbon, or $R^{18}$ and $R^{19}$ groups may together form a ring; $R^{20}$ and $R^{21}$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl.

The catalyst component of the present invention can be activated with trialkylaluminum or an alumioxane compound, rendering it particularly effective for the production of LLDPE. LLDPE produced using the present invention displays a low molecular weight distribution, improved co-monomer incorporation, low content of the low molecular weight component, and excellent morphological properties such as spherical shape and high bulk density.

DETAILED DESCRIPTION OF THE INVENTION

One aspect of the present invention is a catalyst component useful with an advanced Ziegler-Natta system. The catalyst component is prepared in the presence of non-metallocene ligands and comprises Mg, a transition metal (M), a halogen, an alkoxy ligand, silicon, and a chelating diamine ligand. The catalyst utilizing the present catalyst component produces polyethylene copolymer in an improved manner and is compatible with existing production processes such as slurry and gas-phase polymerization.

The catalyst component of the present invention is prepared by treating a magnesium halide composite support with a halogenized transition metal compound (e.g., $MCl_4$, M includes Ti, Zr, Hf, V, Cr) and a chelating diamine compound or its silylated derivative in the presence of organo-magnesium as a promoting agent and halogenized silicon or boron compounds as activator thereof. An example of a suitable magnesium halide support is a composite support prepared by treating metallic magnesium with (i) an alkyl halide or aromatic halide; (ii) a transition metal compound having the structural formula $M(OR)_aX_{4-a}$, wherein M is selected from the group consisting of Ti, Zr, Hf, V, and Cr; R is a $C_{1-20}$ hydrocarbon, X is halogen, and a is an integer from 1 to 4; (iii) at least one electron donating compound containing at least one ether group; and (iv) at least one organo-silicon compound having at least one silicon-oxygen bond.

Examples of suitable diamines are diamines selected from compounds having the general structural formula $R^1R^2N(CR^5{}_2)_xNR^3R^4$, diamino-pyridene ligands, and diketiminato ligands. Silylated derivatives of these compounds can also be used.

As an illustrative embodiment, a catalyst component according to the present invention is prepared by:
(i) forming a slurry from metallic magnesium, iodine, alcohol, and either an alkyl or aromatic halide to form activated metallic magnesium, together with small content of organomagnesium compound having the formula R'MgX;
(ii) contacting the slurry with a transition metal compound having the structural formula $M(OR)_aX_{4-a}$, an electron donor containing at least one ether group, and an organo-silicon compound having a Si—O bond;
(iii) reacting the mixture from step (ii) with an alkyl or aromatic halide to form a magnesium-based support with excellent morphology, and flow ability;
(iv) contacting the mixture from step (iii) with organo-magnesium having the empirical formula R'MgR", and then with a halogenized transition metal compound (e.g., $MCl_4$, M includes Ti, Zr, Hf, V, Cr); and
(v) reacting the mixture from step (iv) with a chelating diamine compound or a silylated derivative in the presence of a halogenized silicon or boron compound as an activator.

Each of these steps are described in more detail below. An exemplary catalyst component of the present invention has the formula $Mg_mTiX_n(OR)_p(Si)_q(D)_r$, wherein x is halogen, D is a diamine, and m, n, p, q, and r are numbers satisfying inequalities $1 \leq m \leq 61$, $1 \leq n \leq 116$, $0.05 \leq p \leq 50$, $0.1 \leq q \leq 20$, $0.1 \leq r \leq 10$ and m<n.

The catalyst component of the present invention can be combined with an organo-aluminum compound to form a solid catalyst system for the copolymerization of alpha-olefins. As further explained below, the solid catalyst system can be used for slurry polymerization or can be subjected to pre-polymerization, which renders the catalyst system suitable for gas phase polymerization processes.

Preparation of a Mg-based Support. The Mg-based support is obtained by in situ by reacting metallic magnesium with an alkyl or aromatic halide, a transition metal compound having the structural formula $M(OR)_aX_{4-a}$, an electron donor containing at least one ether, and an organic silicon compound having a Si—O bond. Any form of magnesium metal can be used, but a preferable magnesium source is finely divided metallic magnesium such as magnesium powder. According to one embodiment, the magnesium is heated under nitrogen prior to use to obtain a fast reaction. The alkyl or aromatic halide preferably has the formula RX, wherein R is an alkyl group containing 3 to 20 carbon atoms or an aromatic group containing 6 to 18 carbon atoms and X is preferably chlorine or bromine. Examples of suitable alkyl and aromatic halides include n-propyl chloride, propyl bromide, iso-propyl chloride, iso-propyl bromide, n-butyl chloride, n-butyl bromide, sec-butyl chloride, sec-butyl bromide, tert-butyl chloride, tert-butyl bromide, iso-amyl chloride, iso-amyl bromide, n-hexyl chloride, n-hexyl bromide, n-octyl chloride, n-octyl chloride, 2-ethylhexyl chloride, 2-ethylhexyl chloride, chlorobenzene, bromobenzene and iodinebenzene.

Examples of suitable solvents include aliphatic hydrocarbons such as hexane, heptane, octane, decane or the like; aromatic hydrocarbons such as toluene, xylene or the like; alicyclic hydrocarbons such as cyclohexane, methylcyclohexane, decalin or the like; and ethers such as diethyl ether, diisopropyl ether, di-n-butyl ether, di-iso-butyl ether, diisoamyl ether, diallyl ether, tetrahydrofuran (THF), and anisole. Particularly preferred are dibutyl ether, diisoamyl ether, hexane, heptane, toluene, and xylene, used either alone or as mixed solvents, depending on the specific reaction.

According to one embodiment, a small amount of iodine, alkyl-alcohol, and/or alkylhalide can be used to initiate or facilitate the reaction between the magnesium and alkyl/aromatic halide. Suitable reagents include butylchloride, butylbromide, 1,2-dibromoethane, 1-propanol, 2-propanol, 1-butanol, 2-butanol, 1-pentanol, and 2-pentanol, respectively. The reaction temperature normally is typically from about 20 to about 200° C. and the reaction time is typically about 0.5 to about 20 hours.

A suitable electron donor such as an aliphatic ether is typically present during the production of the support. The presence of such electron donors leads to better control of the support morphology and the bulky density of polymer. Without being bound by theory, it is suggested that such ethers solubilize the organomagnesium Grignard reagent (R'MgX) formed during the support preparation due to the ability of the magnesium atom to act as a Lewis acid and to associate with at least one electron pair from the etheric oxygen, which acts as a Lewis base. This association controls the initiative rate of the reaction between RMgX and RX to form $MgX_2$ as a support, and makes it possible to produce uniform particles and supports with excellent morphology.

Examples of suitable ethers include diethylether, dibutylether, diisoamylether, anisole, ethylphenylether, methylethylether, methylbutylether, methylcyclohexylether, 2,2-dimethyl-1,3-dimethoxypropane, 2,2-diethyl-1,3-dimethoxypropane, 2,2-di-n-butyl-1,3-dimethoxy-propane, 2-ethyl-2-butyl-1,3-dimethoxypropane, 2-n-propyl-2-cyclopentyl-1,3-dimethoxy-propane, 2,2-dimethyl-1,3-diethoxypropane, 2-n-propyl-2-cyclohexyl-1,3-diethoxypropane, 2,2-diisobutyl-1,3-dimethoxypropane, and 2,2-dicyclopentyl-1,3-dimethoxypropane. The diisoamyl ether particularly preferred.

The diisoamylether/Mg ratio effects the activity of the resulting catalyst. The diisoamylether/Mg ratio is typically from about 0.05 to about 10 and is more typically about 0.10 to about 1.0.

According to one embodiment, an organosilicon compound having a Si—O bond is added, along with the etheric electron donor. The organosilicon compound having a Si—O bond and other electronic donors can be used either alone or as mixed electronic donors. This organic silicon compound having a Si—O bond includes compounds such as $Si(OR^1)_bR^2_{4-b}$, $R^3(R^4_2SiO)_cSiR^5_3$; and $(R^6_2SiO)_d$; wherein $R^1$ is a hydrocarbon group having 1 to 20 carbon atoms, each of $R^2$, $R^3$, $R^4$, $R^5$ and $R^6$ is a hydrocarbon group having 1 to 20 carbon atoms or a hydrogen atom, b is an integer from 0 to 3, c is an integer from 1 to 1000, and d is an integer from 2 to 1000.

Examples of particularly suitable organic silicon compound include tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyl-trimethoxysilane, phenyltrimethoxysilane, phenyltriethoxysilane, benzyl-triphenoxysilane, methyltriallyloxysilane, dimethyldimethoxysilane, dimethyl-diethoxysilane, dimethyl-diisopropyloxysilane, dimethyldibutoxysilane, dimethyldihexyloxysilane, dimethyldiphenoxy-silane, diethyldiethoxysilane, diethyldiisobutoxysilane, diethyldiphenoxysilane, dibutyl-diisopropyloxysilane, dibutyl-dibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyl diphenoxysilane, diallyldipropoxysilane, diphenyldiallyloxysilane, methylphenyldimethoxysilane, chlorophenyldiethyoxysilane, polymethylhydrosiloxane, and polyphenylhydrosiloxane.

Particularly preferred organic silicon compounds are alkoxysilane compounds represented by the formula, $Si(OR^1)_bR^2_{4-b}$, wherein b 1 to 4, and especially tetraalkoxysilane compounds (b=4). The tetraalkoxysilane compound/Mg ratio can be about 0.01 to about 10, and is more typically about 0.10 to about 1.50.

Suitable transition metal compounds with an OR group are represented by the general formula of $M(OR)_aX_{4-a}$, wherein transition metal M is typically selected from Ti, Zr, Hf, V, and Cr. Of these, Ti compounds (e.g., $Ti(OR)_aX_{4-a}$) are particularly suitable. R is typically a hydrocarbon group having 1 to 20 carbon atoms, X is a halogen atom, and "a" is 1 to 4.

Suitable R groups in the formula $(Ti(OR)_aX_{4-a})$ include alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; alkenyl groups such as an allyl group; and aralkyl groups such as a benzyl group. Among these, alkyl groups having 2 to 18 carbon atoms and aryl groups having 6 to 18 carbon atoms are particularly suitable, and straight-chain alkyl groups having 2 to 18 carbon atoms are particularly suitable. When "a" in the above formula is 1 to 4, a titanium compound can be one having two or more (OR) groups different from one another. Suitable "X" groups in the formula of $(Ti(OR)_aX_{4-a})$ include chlorine, bromine, and iodine; chlorine being particularly suitable.

Titanium compounds can be produced according conventional processes, such as (i) a reacting $Ti(OR)_4$ with $TiX_4$ predetermined proportions, and (ii) reacting a corresponding alcohol such as ROH with $TiX_4$. Particular examples of the titanium compound of the general formula $(Ti(OR)_aX_{4-a})$ used in the present invention include, but are not limited to, monomethoxytrichlorotitanium, dimethoxydichlorotitanium, trimethoxymonochloro-titanium, monoethoxytrichlorotitanium, monoethoxytrifluorotitanium, monomethoxytrifluorotitanium, diethoxydifluorotitanium, diethoxydichlorotitanium, diethoxydibromotitanium, triethoxyfluorotitanium, triethoxychlorotitanium, tetraethoxytitanium, monopropoxytrichlorotitanium, dipropoxydichlorotitanium, diisopropoxydichlorotitanium, diisopropoxydibromotitanium, tripropoxyfluorotitanium, tripropoxychlorotitanium, tetra-n-propoxytitanium, tetraisopropoxytitanium, monobutoxy-trichlorotitanium, monoisobutoxytrichlorotitanium, dibutoxydichlorotitanium, diisopropoxy-dichlorotitanium, tributoxyfluorotitanium, tributoxychlorotitanium, triisobutoxychlorotitanium, tetra-n-butoxytitanium, tetra-isobutoxytitanium, tetra-sec-butoxytitanium, tetra-tert-butoxytitanium, monopentoxytrichlorotitanium, dipentoxydichlorotitanium, tripentoxymonochlorotitanium, tetra-n-pentyloxytitanium, tetracyclopentyloxytitanium, monooctyloxy-trichlorotitanium, dioctyloxydichlorotitanium, trioctyloxy-monochlorotitanium, tetra-n-hexyloxytitanium, tetracyclohexyloxytitanium, tetra-n-heptyloxytitanium, tetra-n-octyloxytitanium, tetra-2-ethylhexyloxytitanium, mono-2-ethylhexyloxytrichlorotitanium, di-2-ethylhexyloxydichlorotitanium, tri-2-ethylhexyloxy-monochlorotitanium, tetranonyloxytitanium, tetradecyloxytitanium, tetraisobornyloxy-titanium, tetraoleyloxytitanium, tetraallyloxytitanium, tetrabenzyloxytitanium, tetrabenzhydryloxytitanium, monophenoxytrichlorotitanium, diphenoxydichlorotitanium, triphenoxychlorotitanium, tri-o-xylenoxychlorotitanium, tetraphenoxytitanium, tetra-o-methylphenoxytitanium, tetra-m-methylphenoxytitanium tetra-1-naphthyloxytitanium and tetra-2-naphthyloxytitanium and mixtures thereof. Preferable titanium compounds are titanium tetrachloride, monoethoxytrichlorotitanium, diethoxydichlorotitanium, monobutoxytrichloro-titanium, dibutoxydichlorotitanium, tetraethoxytitanium, tetraisopropoxytitanium, tetra-n-butoxytitanium, tetra-n-hexyloxytitanium, tetra-n-octyloxytitanium, and tetra-2-ethylhexyloxy-titanium.

Promoting Agents and Activators. The "support effect," i.e., the lower activity observed for a catalyst when the catalyst is supported compared to an unsupported or homogeneous catalyst, is typically observed in either bulky ligand metallocene and metallocene-type catalysts, non-metallocene-type catalysts, other 'single-site' advanced catalysts, and even some Ziegler-Natta catalyst. This support effect contributes to the difficulty of commercializing new catalyst systems in currently existing production processes. To eliminate the support effect, one aspect of the present invention is a process of synthesizing a new Ziegler-Natta catalyst with a chelating diamine and/or its silylated derivative by in situ reaction with Mg-based support in the presence of an activator and/or a promoting agent.

Suitable promoting agents include organomagnesium compounds having the empirical formula $R^{22}_m MgR^{23}_n$, wherein $R^{22}$ and $R^{23}$ are the same or different $C_2$–$C_{12}$ alkyl groups; typically $C_4$–$C_{10}$ alkyl groups; and more typically $C_4$–$C_8$ alkyl groups, and most typical $R^{22}$ and $R^{23}$ are butyl groups; and m and n are each 0, 1, or 2, providing that m+n=2. Examples of suitable activators are halogeno compounds of group 13 or 14 elements represented by the formula, $MR^{24}_{m-a}X_a$, wherein M is an atom belonging to group 13 or 14, $R^{24}$ is a hydrocarbon group having 1 to 20 carbon atoms, X is halogen, m is a valence of M, and "a" is an integer from 0 to m. Examples of suitable atoms belonging to group 13 are B, Al, Ga, In and Tl. Of these, B and Al are typical. B and Al are more typical. Examples of atoms belonging to group 14 are C, Si, Ge, Sn and Pb. Of these, Si, Ge and Sn are typical, and Si and Sn are more typical. When M is Si, m is 4, and "a" is typically 3 or 4. X is typically F, Cl, Br or I; most typically Cl.

Examples of $R^{24}$ are alkyl groups such as methyl, ethyl, n-propyl, i-propyl, n-butyl, i-butyl, amyl, i-amyl, hexyl, heptyl, octyl, decyl and dodecyl groups; aryl groups such as phenyl, tolyl, cresyl, xylyl and naphthyl groups; cycloalkyl groups such as cyclohexyl and cyclopentyl groups; alkenyl groups such as an allyl group; and aralkyl groups such as a benzyl group. A typical $R^{24}$ in the above formula is an alkyl or aryl group, and a particularly preferred R is methyl, ethyl, n-propyl, phenyl or p-tolyl group.

Examples of chloro compounds of group 13 elements are trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethyl-chlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride and dimethylthallium chloride. Also suitable are compounds named by replacing the chloro in the above named compounds with F, Br or I.

Examples of chloro compounds of group 14 elements are tetrachloromethane, trichloromethane, dichloromethane, monochloromethane, 1,1,1-trichloroethane, 1,1-dichloroethane, 1,2-dichloroethane, silicon tetrachloride, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethyl-chlorosilane, triphenylchlorosilane, tetrachlorogermane, trichlorogermane, methyl-trichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyl-dichlorotin, di-n-butyldichlorotin, di-i-butyldichlorotin, diphenyldichlorotin, divinyldichlorotin, methyltrichlorotin, phenyltrichlorotin, dichlorolead, methylchlorolead and phenylchlorolead. Also suitable are compounds named by replacing the chloro in the above named compounds with F, Br or I.

As the halogeno compound, trichloroboron, methyldichloroboron, ethyldichloroboron, phenyldichloroboron, silicon tetrachloride, methyldichloroaluminum, ethyldichloroaluminum, tetrachlorosilane, phenyltrichlorosilane, methyltrichlorosilane, ethyltrichlorosilane, n-propyltrichlorosilane, tetrachorotin, are particularly suitable, from a viewpoint of polymerization activity. The activator/$TiCl_4$ ratio is typically about 0.1 to about 10; more typically about 0.5 to about 2.0.

According to one embodiment, the solid catalyst component obtained in the above-mentioned method is filtered and washed, preferably once or more at a temperature of about 50° to 120° C., with a hologenated hydrocarbon solvent (e.g., monochlorobenzene, dichlorometane), an aromatic hydrocarbon (e.g., toluene, xylene) or the like. Further washing may be needed and repeated several times with an aliphatic hydrocarbon solvent (e.g., hexane), before used for polymerization.

Chelating Diamines and Silylated Derivatives thereof. Chelating diamine and its silylated derivatives react with a halogenated transition metal compound (e.g., $MCl_4$) to form catalytically active species for olefin polymerization. Examples of suitable halogenated transition metal compounds include $TiCl_4$, $ZrCl_4$, $HfCl_4$, $TiCl_4 \cdot 2THF$, $TiCl_3 \cdot 3THF$, $3TiCl_3 \cdot AlCl_3$, $CrCl_3 \cdot 3THF$, and $VCl_5$. $TiCl_4$, $TiCl_4 \cdot 2THF$, $TiCl_3 \cdot 3THF$, $3TiCl_3 \cdot AlCl_3$, and $CrCl_3 \cdot 3THF$ are particularly suitable. The chelating diamine/$MCl_4$ ratio is typically about 0.01 to about 5.0; more typically about 0.50 to about 1.50.

According to one embodiment, chelating diamine compound and silylated derivatives thereof are those represented by the formula:

$$R^1R^2N(CR^5{}_2)_xNR^3R^4 \qquad (I)$$

wherein $R^1$, $R^2$, $R^3$ and $R^4$ represent a hydrogen atom or an alkyl group of 1 to 20 carbon atoms such as methyl, ethyl, propyl, isopropyl, isobutyl, n-butyl, s-butyl, t-butyl, pentyl, hexyl, heptyl, octyl, nonyl, decyl, dodecyl, hexadecyl, octadecyl, pentadecyl or cyclopropyl, cyclobutyl, cyclopentyl, cyclohexyl and cycloheptyl; a silicon-containing hydrocarbon group of 3 to 20 carbon atoms including alkylsilyl groups such as trimethylsilyl, triethylsilyl, isopropylsilyl, t-butylsilyl and arylsilyl groups such as phenyldimethylsilyl, diphenylmethylsilyl and alkenylsilyl groups such as allyldimethylsilyl; an alkenyl group of 2 to 20 carbon atoms such as vinyl, propenyl, oleyl or cyclohexenyl; an aryl groups having 6 to 20 carbon atoms such as phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,6-dimethylphenyl, 2,6-di(isopropyl) phenyl, 2,6-di(s-butyl)phenyl, 2,6-di(t-butyl)phenyl, 2,3,4-trimethylphenyl, 2,3,5-trimethylphenyl, 2,3,6-trimethylphenyl, 2,4,6-trimethyl-phenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, n-propylphenyl, i-propyl-phenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, n-tetra-decylphenyl, naphthyl and anthracenyl; an aralkyl group of 7 to 20 carbon atoms such as benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (3,5-dimethylphenyl)methyl, (2,3,4-trimethylphenyl)methyl, (2,3,5-trimethylphenyl)methyl, (2,3,6-trimethylphenyl)-methyl, (3,4,5-trimethylphenyl)methyl, (2,4,6-trimethylphenyl)methyl, (2,3,4,5-tetra-methylphenyl)methyl, (2,3,4,6-tetramethylphenyl)methyl, (2,3,5,6-tetramethylphenyl)-methyl, (pentamethylphenyl)methyl, (ethylphenyl)methyl, (n-propyl-phenyl)methyl, (i-propylphenyl)methyl, (n-butylphenyl)methyl, (sec-butylphenyl)methyl, (tert-butyl-phenyl)methyl, (n-pentylphenyl)methyl, (neopentylphenyl)methyl, (n-hexyl-phenyl)methyl, (n-octylphenyl)methyl, (n-decylphenyl)methyl, (n-tetradecylphenyl)methyl, naphtylmethyl and anthracenylmethyl, each of which may be the same or different provided that at least both $R^1$ and $R^3$ are hydrogen atoms or trimethylsilyl or triethylsilyl groups; $R^5$ are independently a hydrogen atom or a hydrocarbon atom having 1 to 20 carbon atoms as mentioned above for $R^1$–$R^4$, and x is 1 to 7.

Other suitable chelating diamine compounds include diamino-pyridine ligands represented by the following formula:

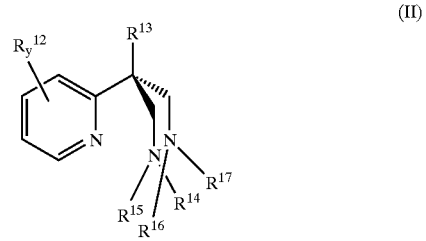

wherein $R^{12}$ represents a hydrogen atom or a hydrocarbon atom having 1 to 20 carbon atoms, as mentioned above for $R^1$–$R^4$ in the (I) structure, and each $R^{12}$ may be the same or different, or the 2 $R^{12}$ groups may together form a ring; y is 1 or 2; $R^{12}$ represents a hydrogen atom or a hydrocarbon atom having 1 to 20 carbon atoms as mentioned above for $R^1$–$R^4$ in the (I) structure, and each may be the same or different; $R^{14}$, $R^{15}$, $R^{16}$ and $R^{17}$ are hydrogen, a hydrocarbon having 1 to 20 carbon atoms, or a silicon-containing hydrocarbon group of 1 to 20 carbon atoms as mentioned above for $R^7$–$R^{10}$ in the (I) structure, and each of which may be the same or different provided that at least both $R^{14}$ and $R^{16}$ are hydrogen, trimethylsilyl, or triethylsilyl.

Other suitable chelating diamine compounds include β-diketiminato ligands represented by the following formula:

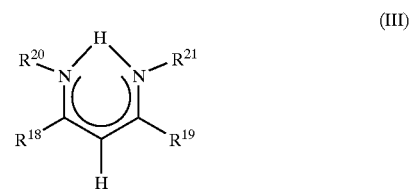

wherein $R^{18}$ and $R^{19}$ are hydrogen or hydrocarbon having 1 to 20 carbon atoms as mentioned above for $R^7$–$R^{10}$ in the (I) structure, and each may be the same or different; or the $R^{18}$ and $R^{19}$ may together form a ring; $R^{20}$ and $R^{21}$ are independently hydrogen or hydrocarbon having 1 to 20 carbon atoms or a silicon-containing hydrocarbon group of 1 to 20 carbon atoms as mentioned above for $R^7$–$R^{10}$ in the (I) structure, and each may be the same or different.

The above-mentioned alkyl, alkylsilyl, aryl, arylsilyl, aralkyl, alkenylsilyl groups in the (I), (II), and (III) structures may be substituted with a halogen atom such as fluorine, chlorine, bromine, and iodine.

Specific chelating diamine compounds represented by general formula (I) include, but are not limited to, N,N'-di(2,6-diisopropylphenyl)-1,3-propanediamine and N,N'-di(2,6-dimethylphenyl)-1,3-propanediamine, N,N'-di(2,6-diisopropylphenyl)-N,N'-di(trimethyl-silyl)-1,3-propanediamine, and N,N'-di(2,6-dimethylphenyl)-N,N'-di(trimethylsilyl)-1,3-propanediamine as described by McConville in *Organometallics* 14, 3154 (1995); 14, 5478 (1995); in *Macromolecules* 29, 5241 (1996) and in *J. Am. Chem. Soc.* 118, 10008 (1996) the entire contents of which are hereby incorporated by reference; N,N'-di(2,6-diisopropylphenyl)-1,2-ethanediamine, N,N'-di(2,6-dimethyl-phenyl)-1,2-ethanediamine, N,N'-di(2,6-diisopropylphenyl)-1,5-pentane-diamine, N,N'-di(2,6-dimethylphenyl)-1,5-pentanediamine, N,N'-di(2,6-diisopropyl-phenyl)-1,4-butanediamine, N,N'-di(2,6-dimethylphenyl)-1,4-butanediamine, N,N'-di(2,6-diisopropylphenyl)-1,4-(butene-2)diamine, N,N'-di(2,6-dimethylphenyl)-1,4-(butene-2)diamine, N,N'-di(2,6-diisopropylphenyl)-2,5-(3-cyclohexyl)thiophenediamine, N,N'-di(2,6-diisopropylphenyl)-α,α'-xylenediamine, N,N'-di(2,6-diterbutylphenyl)-1,3-propanediamine, N,N'-di(2-isopropyl-6-methylphenyl)-1,3-propane-diamine, N,N'-di(2,6-(4-trifluoromethyl)phenyl)-1,3-propanediamine, N,N'-diisopropyl-1,3-propanediamine, N,N'-di(tertbutyl)-1,3-propanediamine, N,N'-di(2,4,6-trimethyphenyl)-1,3-propane-diamine, N,N'-di(2-propylphenyl)-1,3-propanediamine, N,N'-di(1-ethynylcyclohexyl)-1,3-propanediamine, N,N'-di(2,6-dimethylcyclohexyl)-1,3-propanediamine, N,N'-di(propyltriethoysilane)-1,3-propanediamine. N,N'-di(2,6-diethylphenyl)-1,3-propanediamine, N,N'-di(2-isopropyl-6-tertbutylphenyl)-1,3-propanediamine, N,N'-di(2,6-diiso-procyclohexyl)-1,3-propanediamine, N,N'-di(2,6-ditertbutylcyclohexyl)-1,3-propane-diamine, N,N'-di(2,6-diterbutylphenyl)-α,α'-xylenediamine, N,N'-di(2-isopropyl-6-methylphenyl)-α,α'-xylenediamine, N,N'-di(2,6-(4-trifluoromethyl)phenyl)-α,α'-xylene-diamine, N,N'-diisopropyl-α,α'-xylenediamine, N,N'-di(tertbutyl)-α,α'-xylene-diamine, N,N'-di(2,4,6-trimethyphenyl)-α,α'-xylenediamine, N,N'-di(2-propylphenyl)-α,α'-xylenediamine, N,N'-di(1-ethynylcyclohexyl)-α,α'-xylenediamine, N,N'-di(2,6-dimethylcyclohexyl)-α,α'-xylenediamine, N,N'-di(propyltriethoysilane)-α,α'-xylenediamine, N,N'-di(2,6-diethylphenyl)-α,α'-xylene-diamine, N,N'-di(2-isopropyl-6-tertbutylphenyl)-α,α'-xylenediamine, N,N'-di(2,6-diisoprocyclohexyl)-α,α'-xylene-diamine, N,N'-di(2,6-ditertbutylcyclohexyl)-α,α'-xylene-diamine, N,N'-di(2,6-diterbutyl-phenyl)-1,2-ethanediamine, N,N'-di(2-isopropyl-6-methylphenyl)-1,2-ethanediamine, N,N'-di(2,6-(4-trifluoromethyl)phenyl)-1,2-ethanediamine, N,N'-diisopropyl-1,2-ethane-diamine, N,N'-di(tertbutyl)-1,2-ethanediamine, N,N'-di(2,4,6-trimethy-phenyl)-1,2-ethanediamine, N,N'-di(2-propylphenyl)-1,2-ethanediamine, N,N'-di(1-ethynyl-cyclohexyl)-1,2-ethanediamine, N,N'-di(2,6-dimethylcyclohexyl)-1,2-ethane-diamine, N,N'-di(propyltriethoysilane)-1,2-ethanediamine, N,N'-di(2,6-diethylphenyl)-1,2-ethane-diamine, N,N'-di(2-isopropyl-6-tertbutylphenyl)-1,2-ethanediamine, N,N'-di(2,6-diisoprocyclohexyl)-1,2-ethanediamine, N,N'-di(2,6-ditertbutylcyclohexyl)-1,2-ethane-diamine, N,N'-di(2,6-diisopropylphenyl)-N,N'-di(trimethylsilyl)-1,2-ethanediamine, N,N'-di(2,6-dimethyl-phenyl)-N,N'-di(trimethylsilyl)-1,2-ethane-diamine, N,N'-di(2,6-diisopropylphenyl)-N,N'-di(trimethylsilyl)-1,5-pentanediamine, N,N'-di(2,6-dimethyl-phenyl)-N,N'-di(trimethylsilyl)-1,5-pentanediamine, N,N'-di(2,6-diisopropylphenyl)-N,N'-di(trimethylsilyl)-1,4-butanediamine, N,N'-di(2,6-dimethyl-phenyl)-N,N'-di(trimethylsilyl)-1,4-butanediamine, N,N'-di(2,6-diisopropylphenyl)-N,N'-di(trimethylsilyl)-1,4-(butene-2)diamine, N,N'-di(2,6-dimethyl-phenyl)-N,N'-di(trimethylsilyl)-1,4-(butene-2)diamine, N,N'-di(2,6-diisopropylphenyl)-N,N'-di(tri-methylsilyl)-2,5-(3-cyclohexyl)thiophenediamine, N,N'-di(2,6-diisopropylphenyl)-N,N'-di(trimethylsilyl)-α,α'-xylenediamine, N,N'-di(2,6-diterbutylphenyl)-N,N'-di(trimethylsilyl)-1,3-propanediamine, N,N'-di(2-isopropyl-6-methylphenyl)-N,N'-di(trimethylsilyl)-1,3-propanediamine, N,N'-di(2,6-(4-trifluoromethyl)phenyl)-N,N'-di(trimethylsilyl)-1,3-propanediamine, N,N'-diisopropyl-N,N'-di(trimethylsilyl)-1,3-propanediamine, N,N'-di(tert-butyl)-N,N'-di(trimethylsilyl)-1,3-propanediamine, N,N'-di(2,4,6-trimethyphenyl)-N,N'-di(trimethylsilyl)-1,3-propanediamine, N,N'-di(2-propylphenyl)-N,N'-di(trimethylsilyl)-1,3-propanediamine, N,N'-di(1-ethynylcyclohexyl)-N,N'-di(trimethylsilyl)-1,3-propanediamine, N,N'-di(2,6-dimethylcyclohexyl)-N,N'-di(trimethylsilyl)-1,3-propanediamine, N,N'-di(propyltriethoysilane)-N,N'-di(trimethylsilyl)-1,3-propanediamine, N,N'-di(2,6 -diethylphenyl)-N,N'-di(trimethylsilyl)-1,3-propanediamine, N,N'-di(2-isopropyl-6-tertbutylphenyl)-N,N'-di(trimethylsilyl)-1,3-propanediamine, N,N'-di(2,6-diisopropylcyclohexyl)-N,N'-di(trimethylsilyl)-1,3-propane-diamine, N,N'-di(2,6-ditertbutylcyclohexyl)-N,N'-di(trimethylsilyl)-1,3-propanediamine, N,N'-di(2,6-diterbutylphenyl)-N,N'-di(trimethylsilyl)-α,α'-xylenediamine, N,N'-di(2-isopropyl-6-methylphenyl)-N,N'-di(trimethylsilyl)-α,α'-xylenediamine, N,N'-di(2,6-diisopropylphenyl)-N,N'-di(tri-methylsilyl)-α,α'-xylenediamine, N,N'-di(2,6-(4-trifluoromethyl)phenyl)-N,N'-di(trimethylsilyl)-α,α'-xylenediamine, N,N'-diisopropyl-N,N'-di(trimethylsilyl)-α,α'-xylenediamine, N,N'-di(tertbutyl)-N,N'-di(trimethylsilyl)-α,α'-xylenediamine, N,N'-di(2,4,6-trimethyphenyl)-N,N'-di(trimethylsilyl)-α,α'-xylenediamine, N,N'-di(2-propyl-phenyl)-N,N'-di(trimethylsilyl)-α,α'-xylenediamine, N,N'-di(1-ethynylcyclohexyl)-N,N'-di(trimethylsilyl)-α,α'-xylenediamine, N,N'-di(2,6-dimethylcyclohexyl)-N,N'-di(trimethyl-silyl)-α,α'-xylenediamine, N,N'-di(propyltriethoysilane)-N,N'-di(trimethylsilyl)-α,α'-xylenediamine, N,N'-di(2,6-diethylphenyl)-N,N'-di(trimethylsilyl)-α,α'-xylenediamine, N,N'-di(2-isopropyl-6-tertbutylphenyl)-N,N'-di(trimethylsilyl)-α,α'-xylenediamine, N,N'-di(2,6-diisoprocyclohexyl)-N,N'-di(trimethylsilyl)-α,α'-xylenediamine, N,N'-di(2,6-ditertbutylcyclohexyl)-N,N'-di(trimethylsilyl)-α,α'-xylenediamine, N,N'-di(2,6-diterbutylphenyl)-N,N'-di(trimethylsilyl)-1,2-ethanediamine, N,N'-di(2-isopropyl-6-methylphenyl)-N,N'-di(trimethylsilyl)-1,2-ethane-diamine, N,N'-di(2,6-(4-trifluoromethyl)phenyl)-N,N'-di(trimethylsilyl)-1,2-ethanediamine, N,N'-diisopropyl-N,N'-di(trimethylsilyl)-1,2-ethanediamine, N,N'-di(tertbutyl)-N,N'-di(trimethylsilyl)-1,2-ethanediamine, N,N'-di(2,4,6-trimethyphenyl)-N,N'-di(trimethylsilyl)-1,2-ethanediamine, N,N'-di(2-propylphenyl)-N,N'-di(trimethylsilyl)-1,2-ethanediamine, N,N'-di(1-ethynylcyclohexyl)-N,N'-di(trimethylsilyl)-1,2-ethanediamine, N,N'-di(2,6-dimethylcyclohexyl)-N,N'-di(trimethylsilyl)-1,2-ethanediamine, N,N'-di(propyltriethoysilane)-N,N'-di(trimethylsilyl)-1,2-ethanediamine, N,N'-di(2,6-diethylphenyl)-N,N'-di(trimethylsilyl)-1,2-ethanediamine, N,N'-di(2-isopropyl-6-tertbutylphenyl)-N,N'-di(trimethylsilyl)-1,2-ethane-diamine, N,N'-di(2,6-diisoprocyclohexyl)-N,N'-di (trimethylsilyl)-1,2-ethanediamine, N,N'-di(2,6-ditertbutyl-cyclohexyl)-N,N'-di(trimethylsilyl)-1,2-ethanediamine and the like.

Specific chelating diamine compounds represented by general formula (II) include, but are not limited to, 2-methyl-2-(2-pyridine)-propanediamine, 2-tertbutyl-2-(2-pyridine)-propanediamine, 2-isopropyl-2-(2-pyridine)-propanediamine, 2-methyl-2-(2-quinoline)-propane-diamine, 2-tertbutyl-2-(2-2-quinoline)-propanediamine, 2-isopropyl-2-(2-2-quinoline)-propane-diamine, N,N'-di(2,6-diisopropylphenyl)-2-methyl-2-(2-pyridine)-propanediamine, N,N'-di(2,6-dimethylphenyl)-2-methyl-2-(2-pyridine)-propanediamine, N,N'-di(2,6-dimethylphenyl)-2-tertbutyl-2-(2-pyridine)-propanediamine, N,N'-di(2,6-dimethylphenyl)-2-isopropyl-2-(2-pyridine)-propanediamine, N,N'-di(2,6-dimethyl-phenyl)-2-methyl-2-(2-quinoline)-propane-diamine, N,N'-di(trimethylsilyl)-2-methyl-2-(2-pyridine)-propanediamine, N,N'-di(triisopropyl-silyl)-2-methyl-2-(2-pyridine)-propanediamine, N,N'-di(trimethoxylsilyl)-2-methyl-2-(2-pyridine)-propane-diamine, N,N'-di(tributylsilyl)-2-tertbutyl-2-(2-pyridine)-propanediamine, 2,3-diaminopyridine, 4,5-diaminopyrimidine, N,N'-di(trimethylsilyl)-2,3-diaminopyridine, N,N'-di(trimethyl-silyl)-4,5-diaminopyrimidine, N,N'-di(2,6-diisopropylphenyl)-2,3-diamino-pyridine, N,N'-di(2,6-dimethylphenyl)-2,3-diaminopyridine, N,N'-di(2,6-diisopropyl-phenyl)-4,5-diaminopyrimidine, and N,N'-di(2,6-dimethylphenyl)-4,5-diamino-pyrimidine, and the like.

Specific chelating diamine compounds represented by general formula (III) include, but are not limited to, 2-(p-tolylamino)-4-(p-tolylimino)-2-pentene, 2-((2,6-diisopropyl-phenyl)amino)-4-((2,6-diisopropylphenyl)amino)-2-pentene, 2-((2,6-dimethylphenyl)amino)-4-((2,6-dimethylphenyl)amino)-2-pentene, 2-(trimethylsilylamino)-4-(trimethylsilylamino)-2-pentene, and 2-(triisopropylsilylamino)-4-(trimethylsilyl-amino)-2-pentene and the like. The chelating diamine compound/Ti ratio is typically about 0.1 to about 10; more typically about 0.5 to about 2.0.

Solid Catalyst and Organo-aluminum Compound. An organo-aluminum compound having at least one Al-carbon bond is used in combination with the solid catalyst component described above to form a solid catalyst. The organo-aluminum compound is represented by the general formula: AlR'$_3$, wherein each R' is independently hydrogen, halogen, or an amino, alkyl, alkoxy or aryl group, and wherein at least one R' is an alkyl group. The organo-aluminum compound can also be either a linear aluminoxane, represented by the general formula (R$^{25}$)$_2$AlO(AlR$^{25}$)—O)$_n$Al(R$^{25}$)$_2$, wherein each R$^{25}$ denotes an alkyl radical and n is a number from 2 to 40, or may be a cyclic aluminoxane represented by the general formula:

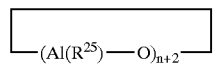

wherein R$^{25}$ and n are as defined above.

Specific examples include trialkylaluminum compounds such as trimethylaluminum, triethylaluminum, tri(n-propyl)aluminum, tri(isopropyl)aluminum, tri(n-butyl)aluminum, tri(isobutyl)aluminum, tri(t-butyl)aluminum, trihexylaluminum, triamyl-aluminum, and tri(n-octyl)aluminum; dialkylaluminum hydrides such as diisobutylaluminum hydride; dialkylaluminum halides such as dimethylaluminum chloride, diethylaluminum chloride, diisobutylaluminum chloride, di(t-butyl)aluminum chloride and diamylaluminum chloride; alkylaluminum dihalides such as methylaluminum dichlorides, ethylaluminum dichloride, isobutylaluminum dichloride, t-butylaluminum dichloride and amylaluminum dichloride; dialkylaluminum alkoxides such as diethylaluminum ethoxide; and alkylalumoxanes such as tetraethyldialumoxane, tetrabutyldialumoxane, methylalumoxane and ethylalumoxane. Among these, the trialkylaluminum, the mixture of the trialkylaluminum and the dialkylaluminum halide, and the alkylalumoxane are particularly suitable. Trimethylaluminum, triethylaluminum, tri-iso-propylaluminum, trihexylaluminum, tri(n-octyl)aluminum, a mixture of triethylaluminum and diethylaluminum chloride, and tetraethyldialumoxane are particularly suitable.

The organo-aluminum compound is typically used in an amount of about 1 to about 10000 mol, and more typically about 5 to about 5000 mol, per mol of the titanium atom in the solid catalyst component.

Pre-Polymerization. According to one embodiment of the present invention, the solid catalyst system may be used for polymerization as is, hereinafter referred to as "slurry polymerization." Alternatively, the solid catalyst component may be subjected to pre-polymerization, thereby obtaining a pre-polymerized catalyst component, which is then used for gas phase polymerization. In carrying out the pre-polymerization, for example, the solid catalyst component and an organo-aluminum compound are contacted with an olefin. Examples suitable olefins for the pre-polymerization are ethylene, propylene and butene-1. The pre-polymerization may be either homopolymerization or copolymerization.

Pre-polymerization, typically utilizes a slurry containing the solid catalyst component and a solvent. Examples of suitable solvents include aliphatic hydrocarbons such as butane, pentane, hexane and heptane, and aromatic hydrocarbons such as toluene and xylene. The concentration of the slurry is typically about 0.001 to about 0.1 g-solid catalyst component/10 ml-solvent, and more typically about 0.02 to about 0.2 g-solid catalyst component/10 ml-solvent. The organo-aluminum compound is typically used in an amount of about 0.1 to about 100, and more typically about 0.5 to about 50, in terms of Al/Ti atomic ratio, i.e., the atomic ratio of the Al atom in the organo-aluminum compound to the Ti atom in the solid catalyst component. The temperature of the pre-polymerization is typically about −30 to about 100° C., and more typically about −10 to about 85° C. Yield of the pre-polymer is typically about 0.1 to about 500 g, and more typically about 0.5 to 50 g, per mmol of Ti. When used for the gas phase polymerization, the pre-polymerized solid catalyst component obtained may be combined with an inert diluent to form a slurry, or dried to obtain a flowing powder.

Olefin Polymerization. The olefin polymerization catalyst according to the present invention may be used for any common olefin polymerization process, i.e., slurry polymerization, gas phase polymerization if pre-polymer is used, high pressure polymerization, solution polymerization or bulk polymerization. The solvent used for the polymerization may be any generally used organic solvent, among which specific examples include benzene, toluene, xylene, butane, pentane, hexane, heptane, cyclohexane and methylene chloride. Alternatively, the olefin itself may also be used as a solvent, for example, in the case of polymerization of propylene, 1-butene, 1-octene, 1-hexene or the like.

Examples suitable olefins for polymerization include alpha-olefins of 2–20 carbon atoms, diene compounds and cyclic olefins. The polymerization may be either homopolymerization using one of these or copolymerization using two or more olefins. A particular preferred embodiment is copolymerization of ethylene with an alpha-olefin having 3–40 carbon atoms to produce linear low density polyethylene (LLDPE), and random ethylene copolymers.

Examples of alpha-olefins include propylene, 1-butene, 1-pentene, 4-methyl-1-pentene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, and 1-nonadecene.

There are no particular restrictions on the polymerization conditions for production of polyolefins, such as the polymerization temperature, polymerization time, polymerization pressure, monomer concentration, etc., but typically the polymerization temperature is about −100 to about 300° C.; the polymerization time is about 10 seconds to about 20 hours and the polymerization pressure is typically about ambient pressure to 3500 kg/cm$^2$. Hydrogen or the like may also be used to adjust the molecular weight during polymerization. The polymerization may be carried out in a batch system, semi-continuous system or continuous system, and it may be carried out in 2 or more stages under different polymerization conditions. The polyolefin may be obtained by isolation and recovery from the solvent and drying, according to conventionally known methods.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

The solid catalyst composition, and properties of polymers in the examples were measured according to the methods described herein. Composition analyses were conducted by ICP emission analysis method to determine Ti, Si, Mg, and Cl content in the solid catalyst component; alkoxy group and diamine groups were tested by an internal standard gas chromomtography (GC). After decomposing a solid component with water or acidic water to obtain a liquid sample, an amount of the an alcohol corresponding to the alkoxy group and diamine corresponding to the diamine group in the obtained liquid sample were measured by GC, followed by converting into the content of alkoxy group and diamine group. Melt flow index (MI) of polymers was measured at 190° C., according to ASTM D1238. Melt flow ratio (MFR), which is the ratio of high melt flow index (HLMI or $I_{21}$) to melt index ($I_2$), was used as a measure of melt fluidity and a measure of the molecular weight distribution of polymer. The melt flow ratio is believed to be an indication of the molecular weight distribution of the polymer; the higher the value, the broader the molecular weight distribution. Density was measured according to ASTM D 1505-98. Molecular weights and molecular weight distributions of polymers were also determined by gel permeation chromatography (GPC) against a polyethylene standard. Thermal analysis (TA) was used to measure the melting point and ΔH of polymers. The content of xylene soluble fraction at room temperature, % CXS, of the polymer was determined by dissolving 2 g of polymer in 200 ml of xylene at 135° C., cooling in a constant temperature bath at 25° C., and filtering through fast filter paper. An aliquot of the filtrate was evaporated to dryness, the residue weighed and the weight % soluble fraction calculated.

Example 1

Synthesis of solid catalyst component. Step (a). A 5 L stainless steel reactor was charged with magnesium powder (32.17 g, 132.34 mmol) under nitrogen. The magnesium was heated at 85° C. for 1 hour, after which hexane (2000 ml) was added. Then iodine (3.33 g), iso-propanol (3.66 ml), and n-chlorobutane (2.8 ml) were successively added to the reaction mixture. After the color of the iodine disappeared, the temperature was cooled down to 75° C., and isoamyl ether (100 ml, 49.16 mmol), tetraethyl orthosilicate (273.8 ml, 1227.52 mmol), were successively added to the reaction mixture over 30 minutes. After temperature was raised to 78° C., titanium (IV) propoxide (22.2 ml, 8.07 mmol) was added to the reaction mixture. Stable reaction took place after n-chlorobutane (213.3 ml) was slowly added over 3.5 hours. The dark reaction mixture formed in the process was stirred for another 2 hours at 80, and another 1 hour at 85° C. The reaction was stopped and the solution was allowed to settle for 30 minutes. The solvent was decanted and the solid was washed with 2000 ml hexane for 4 times. After drying under reduced pressure, a brown catalyst component was obtained. The catalyst component exhibited excellent morphology and flowability. The composition of the resulting solid catalyst component was $Mg_{15.2}TiCl_{17.4}(OR)_{22.5}SiO_{0.5}$.

Step (b). A 250 ml three-necked flask, equipped with a stirrer, a reflux condenser and an addition funnel, was purged with nitrogen. To this reactor was added 100 ml of xylene, 10.0 g of The soild component prepared in step (a) and 17.5 g (33.3 mmol) of N,N'-di(2,6-diisopropylphenyl)-N,N'-di(trimethylsilyl)-1,2-ethane-diamine. The resulting mixture was heated to 80° C. for 30 minutes. Dibutylmagnesium (6.00 mmol) was added to this slurry over 30 minutes. After treatment at 80° C. for 2 hours, silicon tetrachloride (3.73 ml, 32.6 mmol) and titanium (IV) chloride (3.66 ml, 33.3 mmol) were successively added to the reaction mixture for 30 min. The mixture was refluxed in xylene for 6 hours. The resulting deep brown solution was completely precipitated by adding hexanes. The precipitate was filtered, washed with toluene/hexanes 3 times at 65° C., and then washed with hexanes another 3 times, and dried by using hot nitrogen. The composition of the resulting solid catalyst component was $Mg_{12.1}TiCl_{27.4}(OR)_{0.5}Si_{0.2}[diamine]_{1.5}$. Ti content in the solid catalyst is 5.8 wt %.

Ethylene Co-polymerization. A 2.0-liter stainless steel autoclave under a slow nitrogen purge at 65° C. was filled with dry hexane (1000 ml). 1.0 ml of 1.0 M triethylaluminum and 50 mg of solid catalyst component (precursor) was successively introduced into the reactor at 65° C. The reactor was closed, the stirring was increased to 750 rpm, and the internal temperature was raised to 85° C. The internal pressure was increased to 37 psig with hydrogen (29 psi of nitrogen). 100 ml of 1-hexenes and ethylene were introduced to maintain the total pressure at about 90 psig. The co-polymerization was carried out immediately and continued at 85° C. for 30 minutes, and then the ethylene supply was stopped and reactor was allowed to cool. The copolymer was collected and dried under vacuum at 70° C. for 5 hours. 50 g of copolymer having good powder property was obtained and had a density of 0.9039 g/cm$^3$, melting point of 123.0° C. and ΔH=69.4 J/g. The productivity of the catalyst was 4000 g polymer/g catalyst-h-100 psi ethylene; indicating high catalyst activity. The melt index of the polyethylene was 1.194 g/10 minutes, measured at 190° C. under a weight of 2.16 kg (ASTM D 1238 Condition E), and the melt flow ration (MFR) was 25.42. The $M_w/M_n$ ratio of polyethylene, measured by GPC, was 3.3. The content of xylene-soluble portion was 9.6%, which indicates that the content of lower molecular weight component was very small.

Comparative Example 1

A solid catalyst component (or precursor) was prepared in the same manner as in Example 1, except that N,N'-di(2,6-diisopropylphenyl)-N,N'-di(trimethylsilyl)-1,2-ethanediamine was not used. The composition of the resulting solid catalyst component was $Mg_{14.9}TiCl_{16.4}(OR)_{17.5}Si_{0.5}$. Ti content in the solid catalyst is 6.5 wt %.

The co-polymerization was carried out in the same manner as in Example 1. 35 g of copolymer having good powder property was obtained. The polymer had a density of 0.9307 g/cm$^3$, melting point of 128.6° C. and $\Delta H=165.7$ J/g. The productivity of the catalyst was 2800 g polymer/g catalyst-h-100 psi ethylene; indicating very high catalyst activity. The melt index of the polyethylene was 1.094 g/10 minutes, measured at 190° C. under a weight of 2.16 kg (ASTM D 1238 Condition E), and the melt flow ration (MFR) was 28.92. The content of xylene-soluble portion was 25.2%. Though catalyst activity was lower compared with Example 1, the obtained co-polymer had lower comonomer incorporation as indicated in density and DSC results, and contained a very large amount of lower molecular weight components.

Comparative Example 2

Conventionally Supported Non-Metallocene Catalyst. A supported non-metallocene catalyst precursor was prepared by using conventional supporting method, that is, by directly supporting non-metallocene titanium complex ([ArNCH$_2$CH$_2$NAr]TiCl$_2$, Ar=2,6-Me$_2$-C$_6$H$_3$) onto the support prepared in Example 1 (a). A quantity of previous prepared support in the form of a dry powder corresponding to 25 mmol of Mg, prepared in Example 1 (a), was introduced at 25° C. under nitrogen atmosphere into a glass reactor with a capacity of 250 ml, equipped with a stirrer rotating at 350 rpm and with heating and cooling system. 100 ml of a solution of non-metallocene titanium complex, [ArNCH$_2$CH$_2$NAr]TiCl$_2$, in toluene containing 5 mmol of Ti were then introduced into the reactor with stirring. The mixture was then refluxed for 2 hours. At the end of this period the stirring was stopped and then solid catalyst thus obtained was washed four times, each with 200 ml of n-hexane. A solid catalyst that was ready for us was obtained in the good morphology.

Polymerization of Ethylene. Co-polymerization was carried out in the same manner as in Comparative Example 1 (2) except using 50 mg of this conventionally supported catalyst component. 35 g of polyethylene having an excellent powder property was obtained. The productivity of the catalyst was 700 g polymer/g catalyst-h-100 psi ethylene; indicating very low catalyst activity. The bulk density of polymer was 0.385 g/cm$^3$. The melt index of the polyethylene was 0.944 g/10 minutes, measured at 190° C. under a weight of 2.16 kg (ASTM D 1238 Condition E), and the melt flow ration (MFR) was 26.98.

However, MAO was used as cocatalyst instead of TEM, the catalyst activity increased to 1200 g polymer/g catalyst-h-100 psi ethylene; still indicating low catalyst activity. The 'support effect', observed in general supported metallocene and supported non-metallocene catalyst system, still existed in this catalyst system prepared by using conventional method.

Ethylene Co-polymerization with 1-Hexene. The co-polymerization was carried out in the same manner as in Example 1 except using the supported catalyst component prepared in Comparative Example 3. The catalyst activity was very low (1000 g polymer/g catalyst-h-100 psi ethylene), and the reactor was fouled by copolymer. The polymer has a density of less than 0.900 g/cm$^3$, a melting point of 122.8° C. and $\Delta H=65.7$ J/g. The melt index of the polyethylene was 0.889 g/10 minutes, measured at 190° C. under a weight of 2.16 kg (ASTM D 1238 Condition E), and the melt flow ration (MFR) was 26.52.

Comparative Example 3

The co-polymerization was carried out in the same manner as in Comparative Example 2 except that co-catalyst was triethylaluminum (TEA), and the amount of catalyst was 100 mg. 15 g of copolymer was obtained with the density of 0.9290 g/cm$^3$. The productivity of the catalyst was 60 g polymer/g catalyst-h-100 psi ethylene; indicating very low catalyst activity.

Examples 2–6 and Comparative Examples 4–5

The co-polymerizations in Examples 2–6 were carried out in the same manner as in Example 1, except using different types of co-catalyst. The co-polymerizations in Comparative Examples 4–5 were carried out in the same manner as in Comparative Example 1 and Comparative Example 2, respectively.

The co-catalysts triisobutylaluminum (TIBA), trimethylaluminum (TMA), tri(n-octyl)aluminum (TnOA), and MAO were tested with a catalyst precursor of the invention and compared to result in catalysis in which the co-catalyst was triethylaluminum (TEA), as shown in Table 1. The data clearly show that the catalyst system in the present invention, activated with either trialkyaluminum (such as TIBA, TnOA, and TEA), TMA, or MAO has good catalytic performance regarding to activity, molecular weight distribution, co-monomer incorporation. The activity is comparable to current catalyst system in the commercial LLDPE process.

TABLE 1

Comparison of Co-catalysts with Catalyst Precursor of the Invention[a]

| Examples | Co-catalyst | Productivity | MI ($I_2$) | MFR ($I_{21}/I_2$) | Density (g/cm$^3$) | $T_m$, (° C.) | $\Delta H$ (g/J) |
|---|---|---|---|---|---|---|---|
| 2 | TEA | 4800 | 1.294 | 27.02 | 0.9153 | 123.1 | 81.1 |
| 3 | TMA | 6300 | 1.150 | 26.58 | 0.9083 | 122.2 | 69.4 |
| 4 | TIBA | 4200 | 1.052 | 27.27 | 0.9171 | 124.0 | 93.2 |
| 5 | TnOA | 3800 | 1.297 | 27.31 | 0.9182 | 124.5 | 86.3 |
| 6 | MAO | 6000 | 1.286 | 24.22 | <0.900 | 121.0 | 57.2 |
| Comparative example 4 | TMA[c] | 2800 | 1.194 | 29.12 | 0.9292 | 126.7 | 133.8 |
| Comparative example 5 | TMA[b,c] | 3440 | 0.983 | 29.01 | 0.9210 | 124.8 | 114.5 |

[a]Polymerization Conditions: see Example 1 (3). Catalyst precursor is 50 mg. [1-Hexene] = 100 ml, Productivity is given in units of gram polymer/gram catalyst-h-100 psi ethylene.
[b]Amount of catalyst precursor is 100 mg.
[c]catalyst precursor without diamine

Examples 7–13

Solid catalyst components (or precursors) were prepared in the same manner as in Example 1, except that N,N'-di(2,6-diisopropylphenyl)-N,N'-di(tri-methyl-silyl)-α,α'-xylene-diamine, N,N'-di(2,6-diisoprocyclohexyl)-N,N'-di(trimethylsilyl)-9,10-phenanthrene-diamine, N,N'-di(2,6-diisopropylphenyl)-2-methyl-2-(2-pyridine)-propane-diamine (diamino-pyridine), and 2-((2,6-diisopropylphenyl)amino)-4-((2,6-diisopropylphenyl)amino)-2-pentene (β-diketimide) were used. The composition of the resulting solid catalyst components was $Mg_{12.5}TiCl_{26.5}(OR)_{0.4}Si_{0.2}$ [diamine]$_{1.3}$, $Mg_{14.1}TiCl_{27.6}(OR)_{0.3}Si_{0.2}$[diamine]$_{1.4}$, $Mg_{12.6}TiCl_{27.1}(OR)_{0.2}Si_{0.2}$[diamine]$_{1.2}$, and $Mg_{12.8}TiCl_{26.2}(OR)_{0.2}Si_{0.2}$[diamine]$_{1.3}$, respectively. Ti content in the solid catalysts was about 7.0 wt %.

The co-polymerization was carried out in the same manner as in Example 1. The data show that diamine-based catalysts have a narrower molecular weight distribution and better co-monomer incorporation compared to those of the control as evident from their much lower MFR, much lower density and melting point and/or ΔH values. In addition, the low molecular weight component in the catalyst of the present invention is much less than that of the catalytic compositions free of the silylated chelating diamine compound or a chelating diamine or its derivative. Of all chelating diamine compounds, chelating diamine containing the general structural formula of $R^1R^2N(CR^5{}_2)_xNR^3R^4$ (I), and β-diketiminato ligand (III) show the best results when activating with an organo-aluminum co-catalyst. The Ziegler-Natta catalyst with diamino-pyridine ligand (II) show second best results.

Example 14

A solid catalyst component (or precursor) was prepared in the same manner as in Example 1 except that trichloroboron replaced silicon tetrachloride as an activator. Polymerization was carried out in the same manner as in Example 3. 48 g of co-polymer having good powder property was obtained with a density of 0.9037 g/cm$^3$, melting point of 123.2° C. and ΔH=65.7 J/g. The productivity of the catalyst was 3840 g polymer/g catalyst-h-100 psi ethylene, indicating very high catalyst activity. The melt index of the polyethylene was 0.945 g/10 minutes, measured at 190° C. under a weight of 2.16 kg (ASTM D 1238 Condition E), and the melt flow ration (MFR) was 25.92. The content of xylene-soluble portion was 10.2%. The data shows that catalyst activity, comonomer incorporation, MWD, and the amount of lower molecular weight components (CXS %) are very similar to the solid catalyst precursor with SiCl$_4$ as activator.

Example 15

Pre-polymerization and Preparation of Pre-polymer. Into a 5-liter stainless steel reactor equipped with a stirrer rotating at 750 revolution/minute were introduced under nitrogen 2 liters of n-hexane that were heated to 65° C., then followed with 18.5 ml of TnOA (765.2 mmol/L) and 8.2 g of the solid catalyst precursor prepared according to Example 1. When the temperature was raised to 68° C., ethylene was introduced into the reactor at a uniform rate of 160 g/h for 180 minutes. At the end of this period, the reactor was cooled to ambient temperature (25° C.) and the contents of the reactor were transferred to a flask and the solvent was evaporated off

TABLE 2

Comparison of Co-catalysts with Catalyst Precursor of the Invention[a]

| Examples | Diamine | Product. | MI ($I_2$) | MFR ($I_{21}/I_2$) | Density (g/cm$^3$) | $T_m$ (° C.) | ΔH (g/J) | CXS (Wt %) |
|---|---|---|---|---|---|---|---|---|
| 7 | None | 2800 | 1.094 | 28.92 | 0.9307 | 128.6 | 165.7 | 25.2 |
| 8 | None[b] | 3200 | 0.998 | 28.90 | 0.9194 | 124.7 | 108.4 | 29.8 |
| 9 | N,N'-di(2,6-diisopropylphenyl)-N,N'-di(trimethylsilyl)-1,2-ethane-diamine | 4000 | 1.194 | 25.42 | 0.9039 | 123.0 | 69.4 | 9.6 |
| 10 | N,N'-di(2,6-diisopropylphenyl)-N,N'-di(tri-methyl-silyl)-α,α'-xylenediamine | 4000 | 1.090 | 26.12 | <0.900 | 122.4 | 56.3 | 7.2 |
| 11 | N,N'-di(2,6-diisoprocyclohexyl)-N,N'-di(trimethylsilyl)-9,10-phenan-threnediamine | 2200 | 1.152 | 26.58 | 0.9083 | 123.2 | 74.8 | 10.2 |
| 12 | N,N'-di(2,6-diisopropylphenyl)-2-methyl-2-(2-pyridine)-propane-diamine | 3000 | 0.982 | 25.27 | 0.9140 | 124.0 | 94.2 | 14.2 |
| 13 | 2-((2,6-diisopropylphenyl)amino)-4-((2,6-diisopropylphenyl)amino)-2-pentene | 4100 | 1.197 | 25.71 | <0.900 | 122.5 | 67.4 | 7.5 |

[a]Polymerization Conditions: see Example 1, and amount of catalyst precursor is 50 mg. [1-Hexene] = 100 ml, Productivity is given in units of gram polymer/gram catalyst-h-100 psi ethylene.
[b]Amount of catalyst precursor is 100 mg.

under reduced pressure at a temperature of 60° C. The pre-polymer thus obtained was stored under nitrogen. The pre-polymer contained 58 g of polyethylene per mmol of titanium and the atomic ratio of Al/Ti was 1.2. It consisted of spheroid particle with less fine particle (6.5% of 80 μm particle).

Gas phase polymerization of ethylene. A powder charge of 50 g a polyethylene originating from a preceding polymerization and which had been stored under nitrogen was introduced into a 2-liter batch reactor equipped with a stirrer rotating at 1000 revolution/minute at 65° C. 1.0 ml of 0.76 M TnOA was introduced, and then 4 g of the previously prepared pre-polymer were introduced into the reactor. The internal pressure was increased to 37 psig with hydrogen (29 psi of nitrogen). Ethylene was introduced to maintain the total pressure at about 145 psig. The polymerization was carried out immediately and the temperature was raised to 85° C. The ethylene supply was kept at constant pressure during the polymerization for 2 hours under a constant temperature of 85° C. Polymerization was stopped by terminating the ethylene supply and the reactor was allowed to cool. A polyethylene powder was thus obtained, having a density of 0.945 g/cm$^3$, melt index of 1.245 g/10 minutes, measured at 190° C. under a weight of 2.16 kg (ASTM D 1238 Condition E), and a melt flow ration (MFR) of 25.52. The powder consisted of spheroid particles with excellent flow-ability, and a bulky density of 0.41 g/cm$^3$.

Gas phase co-polymerization of ethylene and 1-hexene. A powder charge of 50 g a polyethylene originating from a preceding co-polymerization and which had been stored under nitrogen was introduced into a 2-liter batch reactor equipped with a stirrer rotating at 1000 revolution/minute at 65° C. 100 ml of 1-hexene and 1.5 ml of 0.76 M TnOA was successively introduced, followed by 4 g of the previously prepared pre-polymer. The internal pressure was increased to 36 psig with hydrogen (29 psi of nitrogen). Ethylene was introduced to maintain the total pressure at about 90 psig. The polymerization was carried out immediately and the temperature was raised to 85° C. The ethylene supply was kept at constant pressure during the polymerization for 30 minutes at a constant temperature of 85° C. Polymerization was stopped by terminating the ethylene supply and the reactor was allowed to cool. An ethylene/1-hexene copolymer powder was thus obtained, having a density of 0.916 g/cm$^3$, melt index of 1.024 g/10 minutes, measured at 190° C. under a weight of 2.16 kg (ASTM D 1238 Condition E), and a melt flow ration (MFR) of 27.12. The powder consisted of spheroid particles with excellent flow-ability, and a bulky density of 0.40 g/cm$^3$.

These polymerization results show that the in situ reaction processes provided in Example 1 to produce a solid catalyst containing a non-metallocene is a highly effective method of producing supported catalysts combining both Ziegler-Natta and advanced catalyst (e.g., metallocene, non-metallocene, single site catalyst).

One of skill in the art will appreciate that the present invention provides a solid catalyst that fully satisfies the objects, aims, and advantage set forth above. The catalyst precursor, activated with a trialkylaluminum or organoaluminum compound, is particularly effective for the production of linear low-density polyethylene (LLDPE) having narrow molecular weight distribution, improved co-mono mer incorporation, a low content of low molecular weight component, and excellent morphological properties such as spherical shape and a high bulk density. Catalysts of the present invention are suitable for slurry and gas phase polymerization.

Particularly disclosed is a catalyst component useful for the co-polymerization of ethylene and an alpha-olefin, wherein the catalyst component is prepared by: (i) providing a magnesium halide composite support by treating metallic magnesium with an alkyl halide or aromatic halide, a transition metal compound having the structural formula $M(OR)_aX_{4-a}$, at least one electron donating compound containing at least one ether group, and at least one organo-silicon compound having at least one silicon-oxygen bond; wherein M is selected from the group consisting of Ti, Zr, Hf, V, and Cr; R is a $C_{1-20}$ hydrocarbon, X is halogen, and a is 1 to 4; and (ii) treating the magnesium halide composite support with a halogenized transition metal compound and a chelating diamine compound in the presence of one or more compounds selected from the group consisting of organo-magnesium compounds, halogenized silicon compounds, and halogenized boron compounds.

According to one embodiment, the organo-silicon compound is selected from $Si(OR^1)_bR^2_{4-b}$, $R^3(R^4_2SiO)_cSiR^5_3$, or $(R^6_2SiO)_d$; wherein wherein $R^1$ is a hydrocarbon having 1 to 20 carbons; $R^2$, $R^3$, $R^4$, $R^5$ and $R^6$ are independently hydrogens or hydrocarbons having 1 to 20 carbons; b is 1 to 4; c is 1 to 1000; and d is 2 to 1000.

According to one embodiment, the chelating diamine compound has the formula:

$R^1R^2N(CR^5_2)_xNR^3R^4$ wherein $R^1$, $R^2$, $R^3$ and $R^4$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl; provided that at least both $R^1$ and $R^3$ are hydrogen, trimethylsilyl, or triethylsilyl group; $R^5$ is hydrogen or $C_{1-20}$ hydrocarbon, and x is from 1 to 7.

Alternatively, the chelating diamine compound has the formula:

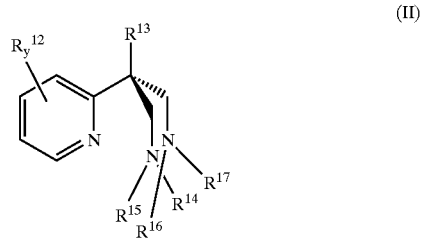

(II)

wherein $R^{12}$ is independently hydrogen or $C_{1-20}$ alkyl, or two $R^{12}$ groups may together form a ring, y is 1 or 2; $R^{13}$ is hydrogen or $C_{1-40}$ alkyl; $R^{14}$, $R^{15}$, $R^{16}$ and $R^{17}$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl; provided that at least both $R^{14}$ and $R^{16}$ are hydrogen atom or trimethylsilyl or triethylsilyl group.

Alternatively, the chelating compound has the formula:

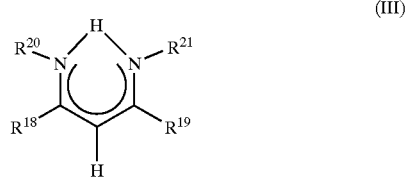
(III)

wherein $R^{18}$ and $R^{19}$ are independently hydrogen, $C_{1-20}$ hydrocarbon, or $R^{18}$ and $R^{19}$ groups may together form a ring; $R^{20}$ and $R^{21}$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl.

Step (ii) can comprise treating the magnesium halide composite support with a halogenated transition metal compound of the formula $m(M^1X^1_a).n(M^2X^2_b).o(THF)$, wherein $M^1$ and $M^2$ are independently selected from the group consisting of Ti, Zr, Hf, Al, V, Al, and Cr; $X^1$ and $X^2$ are halogen; a and b are independently 2 to 5; and m, n, and o are independently 0 to 4. According to one embodiment, the halogenated transition metal compound is selected from the group consisting of $TiCl_4$, $ZrCl_4$, $HfCl_4$, $TiCl_4.2THF$, $TiCl_3.3THF$, $3TiCl_3.AlCl_3$, $CrCl_3.3THF$, and $VCl_5.TiCl_4$, $TiCl_4.2THF$, $TiCl_3.3THF$, $3TiCl_3.AlCl_3$, and $CrCl_3.3THF$.

Step (ii) can comprise treating the magnesium halide composite support with an organo-magnesium compound having the formula R'MgR", wherein R' and R" are independently $C_{2-12}$ alkyl groups.

Step (ii) can comprise treating the magnesium halide composite support with a compound having the formula $MR_{m-a}X_a$, wherein M is a Group 13 or Group 14 element, R is a C1–20 hydrocarbon, X is halogen, m is a number equal to the valence of M, and a is 1 to m.

According to one embodiment, the catalyst component of the present invention has the formula $Mg_m TiX_n(OR)_p(Si)_q(D)_r$, wherein x is halogen, D is a diamine, and m, n, p, q, and r are numbers satisfying inequalities $1 \leq m \leq 61$, $1 \leq n \leq 116$, $0.05 < p \leq 50$, $0.1 \leq q \leq 20$, $0.1 \leq r \leq 10$ and m<n. The catalyst component can further comprise one or more trialkylaluminum species selected from the group consisting of trimethylaluminum, triethylaluminum, tri-iso-propylaluminum, and tri(n-octyl)aluminum. According to one embodiment, the molar ratio of the trialkylaluminum to transition metal is about 1 to about 1000.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

A solid catalyst component useful for the (co)-polymerization of olefins is disclosed. The catalyst component is prepared by reacting an activated magnesium halide composite support with a halogenized transition metal compound and a chelating diamine compound in the presence of organo-magnesium as a promoting agent and halogenized silicon or boron compounds as an activator. The catalyst component can be used with an organo-aluminum compound to provide a solid catalyst system that is compatible with slurry and gas phase polymerization processes. Linear low density polyethylene (LLDPE) produced using the catalyst component of the present invention displays a low molecular weight distribution, improved co-monomer incorporation, low content of the low molecular weight component, and excellent morphological properties such as spherical shape and high bulk density.

What is claimed is:

1. A catalyst component useful for the co-polymerization of ethylene and an alpha-olefin, wherein the catalyst component is prepared by:

(i) providing a magnesium halide composite support by treating metallic magnesium with an alkyl halide or aromatic halide, a transition metal compound having the structural formula $M(OR)_a X_{4-a}$, at least one electron donating compound containing at least one ether group, and at least one organo-silicon compound having at least one silicon-oxygen bond; wherein M is selected from the group consisting of Ti, Zr, Hf, V, and Cr; R is a $C_{1-20}$ hydrocarbon, X is halogen, and a is 1 to 4;

(ii) treating the magnesium halide composite support with a halogenized transition metal compound and a chelating diamine compound in the presence of an organo-magnesium compound and one or more compounds selected from the group consisting of halogenized silicon compounds and halogenized boron compounds.

2. The catalyst component of claim 1, wherein the organo-silicon compound is selected from $Si(OR^1)_b R^2_{4-b}$, $R^3(R^4_2SiO)_c SiR^5_3$, or $(R^6_2SiO)_d$; wherein $R^1$ is a hydrocarbon having 1 to 20 carbons; $R^2$, $R^3$, $R^4$, $R^5$ and $R^6$ are independently hydrogens or hydrocarbons having 1 to 20 carbons; b is 1 to 4; c is 1 to 1000; and d is 2 to 1000.

3. The catalyst component of claim 1, wherein the chelating diamine compound has the formula:

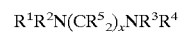

$R^1R^2N(CR^5_2)_x NR^3R^4$ wherein $R^1$, $R^2$, $R^3$ and $R^4$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl; provided that at least both $R^1$ and $R^3$ are hydrogen, trimethylsilyl, or triethylsilyl group; $R^5$ is hydrogen or $C_{1-20}$ hydrocarbon, and x is from 1 to 7.

4. The catalyst component of claim 1, wherein the chelating diamine compound has the formula:

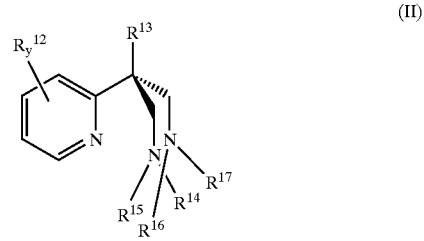
(II)

wherein $R^{12}$ is independently hydrogen or $C_{1-20}$ alkyl, or two $R^{12}$ groups may together form a ring, y is 1 or 2; $R^{13}$ is hydrogen or $C_{1-40}$ alkyl; $R^{14}$, $R^{15}$, $R^{16}$ and $R^{17}$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl; provided that at least both $R^{14}$ and $R^{16}$ are hydrogen atom or trimethylsilyl or triethylsilyl group.

5. The catalyst component of claim 1, wherein the chelating compound has the formula:

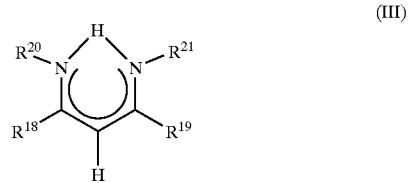

(III)

wherein $R^{18}$ and $R^{19}$ are independently hydrogen, $C_{1-20}$ hydrocarbon, or $R^{18}$ and $R^{19}$ groups may together form a ring; $R^{20}$ and $R^{21}$ are independently hydrogen, $C_{1-20}$ alkyl, $C_{1-20}$ alkenyl, $C_{1-20}$ alkylsilyl, $C_{1-20}$ alkenylsilyl, aryl, arylsilyl, or halogenated derivatives of $C_{1-20}$ alkyl, $C_{1-20}$ alkenyl, $C_{1-20}$ alkylsilyl, $C_{1-20}$ alkenylsilyl, aryl, or arylsilyl.

6. The catalyst component of claim 1, wherein the halogenated transition metal compound of step (ii) comprises a compound of the formula $m(M^1X^1_a) \cdot n(M^2X^2_b) \cdot o(THF)$, wherein $M^1$ and $M^2$ are independently selected from the group consisting of Ti, Zr, Hf, Al, V, and Cr; $X^1$ and $X^2$ are halogen; a and b are independently 2 to 5; and m, n, and o are independently 0 to 4.

7. The catalyst component of claim 6, wherein the halogenated transition metal compound is selected from the group consisting of $TiCl_4$, $ZrCl_4$, $HfCl_4$, $TiCl_4 \cdot 2THF$, $TiCl_3 \cdot 3THF$, $3TiCl_3 \cdot AlCl_3$, $CrCl_3 \cdot 3THF$, and $VCl_5 \cdot TiCl_4$, $TiCl_4 \cdot 2THF$, $TiCl_3 \cdot 3THF$, $3TiCl_3 \cdot AlCl_3$, and $CrCl_3 \cdot 3THF$.

8. The catalyst component of claim 1, wherein the organomagnesium compound of step (ii) comprises a compound having the formula R'MgR'', wherein R' and R'' are independently $C_{2-12}$ alkyl groups.

9. The catalyst component of claim 1, wherein the one or more compounds selected from the group consisting of halogenized silicon compounds and halogenized boron compounds of step (ii) comprises a compound having the formula $MR_{m-a}X_a$, wherein M is silicon or boron, R is a C1–20 hydrocarbon, X is halogen, m is a number equal to the valence of M, and a is 1 to m.

10. The catalyst component of claim 1, having the formula $Mg_mTiX_n(OR)_p(Si)_q(D)_r$, wherein x is halogen, D is a diamine, and m, n, p, q, and r are numbers satisfying inequalities $1 \leq m \leq 61$, $1 \leq n \leq 116$, $0.05 \leq p \leq 50$, $0.1 \leq q \leq 20$, $0.1 \leq r \leq 10$ and m<n.

11. The catalyst component of claim 1, further comprising one or more trialkylaluminum species selected from the group consisting of trimethylaluminum, triethylaluminum, tri-iso-propylaluminum, and tri(n-octyl)aluminum.

12. The catalyst component of claim 11, wherein the molar ratio of the trialkylaluminum to transition metal is about 1 to about 1000.

* * * * *